United States Patent [19]
Seya et al.

[11] Patent Number: 5,004,900
[45] Date of Patent: Apr. 2, 1991

[54] FOCUSING ERROR DETECTING APPARATUS WITH LIGHT SWITCHING AND DETECTOR SAMPLING

[75] Inventors: Masatomo Seya; Michihiro Tadokoro; Kazuo Okada, all of Amagasaki, Japan

[73] Assignee: Mitsubishi Denki Kabushiki Kaisha, Tokyo, Japan

[21] Appl. No.: 377,315

[22] Filed: Jul. 10, 1989

[30] Foreign Application Priority Data

Jul. 21, 1988 [JP]   Japan ................................ 63-182109

[51] Int. Cl.⁵ .......................................... G01J 1/20
[52] U.S. Cl. ............................ 250/201.5; 369/44.24
[58] Field of Search ................. 250/201.5; 369/44, 45, 369/46, 44.17, 44.23, 44.24

[56] References Cited

U.S. PATENT DOCUMENTS

| | | | |
|---|---|---|---|
| 4,363,961 | 12/1982 | Okada et al. | 250/201 |
| 4,654,515 | 3/1987 | Ando | 250/201.5 |
| 4,687,916 | 8/1987 | Emoto et al. | 250/201 |

FOREIGN PATENT DOCUMENTS

| | | |
|---|---|---|
| 140533 | 10/1979 | Japan . |
| 208946 | 12/1983 | Japan . |
| 2120493 | 11/1983 | United Kingdom . |
| 2135150 | 8/1984 | United Kingdom . |

OTHER PUBLICATIONS

Patent Abstracts of Japan, vol. 11, No. 248 (P-604)[2695], Aug. 13th, 1987; & JP-A-62 54 224 (Olympus Optical Co., Ltd.), 09/03/87, *Whole Abstract*.

Primary Examiner—David C. Nelms
Attorney, Agent, or Firm—Oblon, Spivak, McClelland, Maier & Neustadt

[57] ABSTRACT

A focusing error detecting apparatus comprises an objective lens system for focusing a ray flux on a surface of an optical recording disk, two photo detectors, an optical means including the lens system and a beam splitter, for focusing a ray flux reflected from the optical recording disk so that the ray flux comes to the middle of a space formed between the two photo detectors when the focal point is formed on the optical recording disk, a combination of two interruption/deflection elements and a control device for switching the ray flux transmitted from the optical recording disk at the two positions which correspond to said two photo detectors, two sampling/holding circuits respectively hold differences of output of the two photo detectors in correspondence to the switching operations of the interruption/deflection elements and the control device, and a subtracting circuit for outputting a focusing error signal on the basis of the outputs of the sampling/holding circuit.

5 Claims, 6 Drawing Sheets

FOCUSING ERROR DETECTING APPARATUS WITH LIGHT SWITCHING AND DETECTOR SAMPLING

The present invention relates to a focusing error detecting apparatus. More particularly, it relates to a focusing error detecting apparatus used preferably for controlling the focal point of an objective lens for an optical type data recording/reproducing apparatus.

Figure 5:
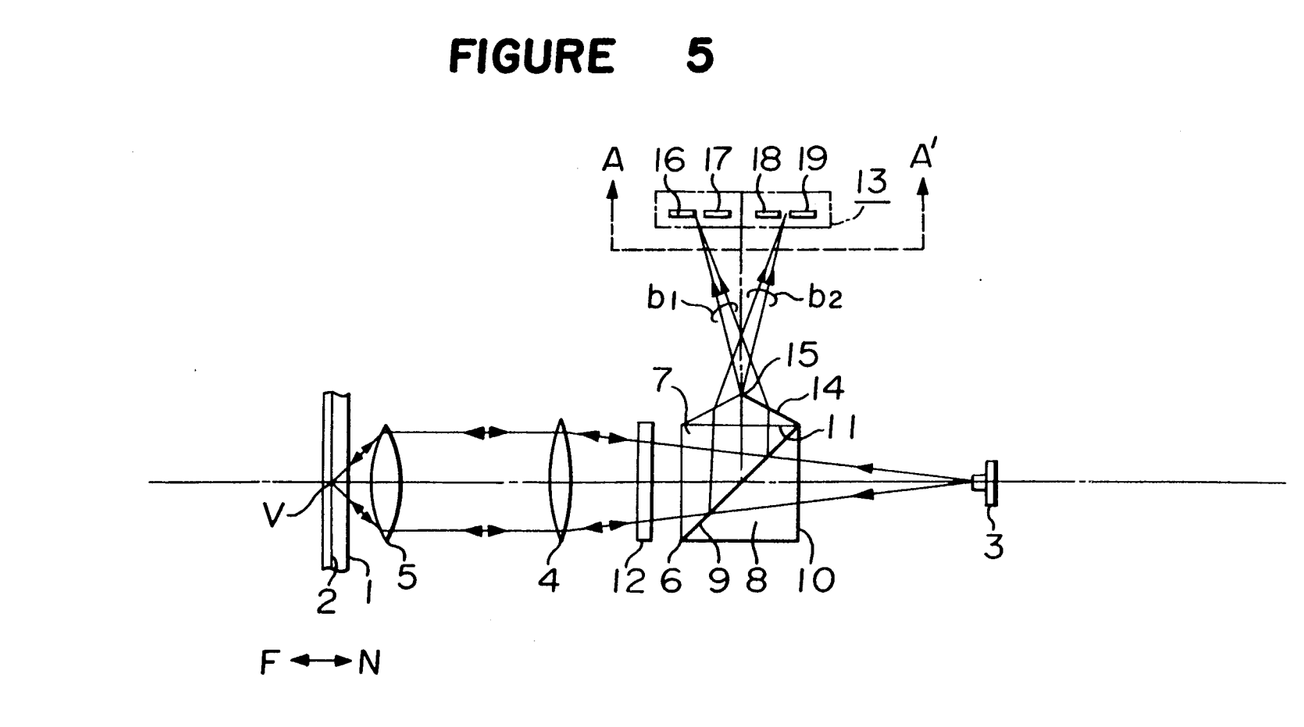
FIG. 5 is a diagram showing a conventional focusing error detecting apparatus.

FIG. 5 is a diagram showing a conventional focusing error detecting apparatus as disclosed in, for instance, Japanese Unexamined Patent Publication No. 208946/1983 in which there is disclosed a construction to detect focusing error in a recording/reproducing system adapted to record data to and reproduce the data from a disk-like recording substrate by using a Foucault method. In FIG. 5, a reference numeral 1 designates a well-known disk-like recording substrate in which data are optically recorded or reproduced, a numeral 2 designates a track formed on the upper side of the disk-like recording substrate 1 in which a large number of sections of information are arranged, a numeral 3 designates a ray source such as a semiconductor laser diode to emit light beams to write data or reproduce them from the disk-like recording substrate 1, a numeral 4 designates a lens to transform the light beams emitted from the ray source 3 into parallel light beams, a numeral 5 designates an objective lens system to form a small light spot on the track of the disk-like recording substrate 1 so that the data on the track are recorded or reproduced, a numeral 6 designates a polarized beam splitter comprising a first prism element 7 for taking out the light beams deflected on the disk-like recording substrate 1, a second prism element 8 and a polarization film 9 formed on the contacting surface of the first and the second prism elements 7, 8, a numeral 10 designates the entrance face of the polarized beam splitter, a numeral 11 designates the exit face of the beam splitter 6, a numeral 12 designates a $\lambda/4$ plate (one fourth ($\frac{1}{4}$) wavelength plate) to reflect at the polarized beam splitter 6 the light beams from the disk-like recording substrate 1 so as not to have the light beams returned to the ray source 3, a numeral 13 designates a light detecting means which comprises four-divided photo detectors 16, 17, 18, 19 to detect light from the exit face of the polarized beam splitter 6, and a numeral 14 designates a roof-shaped prism provided at the exit face 11 of the polarized beam splitter 6, which is provided with a refraction ridge 15 to produce a focusing error signal which indicates the magnitude and the direction of an error produced between the focal point surface of the objective lens system 5 and the surface of the disk-like recording substrate 1.

Figure 6:
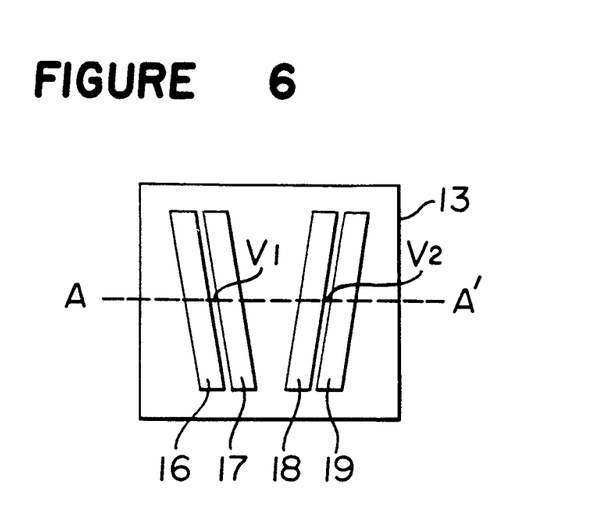
FIG. 6 is a front view of a light detecting means shown in FIG. 5.
Figure 7:
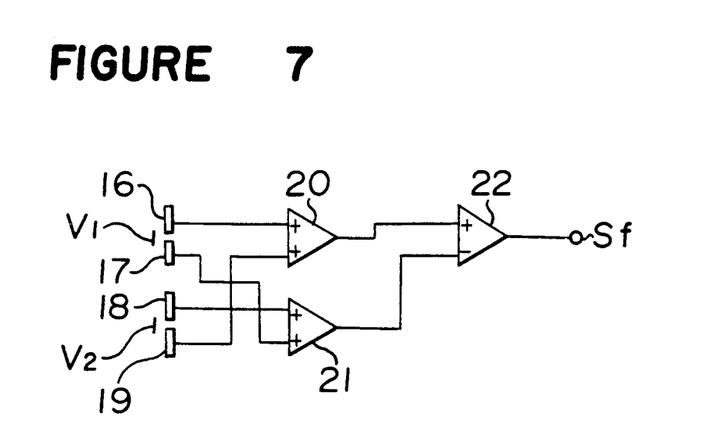
FIG. 7 is a block diagram of a circuit to receive output signals from the light detecting means 13 in FIG. 5.

FIG. 6 is a front view of the light detecting means viewed from the direction of a line A—A' in FIG. 5, and FIG. 7 is a block diagram showing a circuit for processing the outputs of the photo detectors 16, 17, 18, 19 of the light detecting means 13 to generate a focusing error signal. In FIGS. 6 and 7, a numeral 20 designates a first adder for summing the outputs of the detectors 16, 19, a numeral 21 designates a second adder for summing the outputs of the detectors 17, 18, and a numeral 22 designates a subtracter for subtracting a value of the output of the second adder 21 from that of the first adder 20.

The operation of the conventional focusing error detecting apparatus will be described with reference to a case of reading data from the disk-like recording substrate 1.

Laser beams emitted from the ray source 3 are passed through the polarized beam splitter 6 and the $\lambda/4$ plate 20 and are transformed into parallel beams by means of the lens 4. The parallel beams are gathered to form a light spot V having the smallest dimension necessary to read the data on the disk-like recording substrate 1 by means of the objective lens system 5. The light beams for reading which form the light spot V are reflected on the disk-like recording substrate 1. Since the disk-like recording substrate 1 is rotated, reflected light beams are modulated on the basis of the data recorded therein. The polarized beam splitter 6 and the $\lambda/4$ plate 12 arranged between the ray source 3 and the objective lens system 5 separate the modulated light beams reflected on the disk-like recording substrate 1 from the light beams emitted from the ray source 3. The $\lambda/4$ plate 12 is so adapted that its light polarization face is rotated 90° during which the light beams are passed twice. Accordingly, while the polarized beam splitter 6 permits the most part of the light beams emitted from the ray source 3 to pass therethrough, it reflects the most part of the modulated light beam from the disk-like recording substrate 1 to the light detecting means 13. The light detecting means 13 detects a signal which has been modulated on the basis of the data recorded in the disk-like recording substrate 1.

On the other hand, the roof-shaped prism 14, which is provided on the exit face 11 of the polarized beam splitter 6 to produce a focusing error signal representing the magnitude and the direction of an error between the focal point of the objective lens system 5 and the recording surface of the disk-like recording substrate 1, divides the light beams reflected on the polarized beam splitter 6 into two sub beam fluxes $b_1$, $b_2$ which are respectively entered into each pairs of detectors 16, 17 and 18, 19 which constitute the light detecting means 13.

FIGS. 5 and 6 show a state that the beams for reading correctly give a focal point on the data recording surface of the disk-like recording substrate 1. In this case, the sub-beam fluxes $b_1$, $b_2$ enter in each pairs of corresponding detectors 16, 17 and 18, 19 in an symmetric manner. Namely, a light spot $V_1$ is on the split line of the photo detectors 16, 17 and a light spot $V_2$ is on the split line of the photo detectors 18, 19. The light spots $V_1$, $V_2$ of the sub-beam fluxes $b_1$, $b_2$ respectively give focal points on the light detecting means 13 when the beams for reading give the focal point on the disk-like recording substrate 1. When there is a focusing error, there appear deflections in the light spots $V_1$, $V_2$.

FIG. 7 shows a circuit for processing each output signal from the photo detectors 16, 17, 18, 19 which constitute the light detecting means 13. Each output from the detectors 16, 19 is input to the first adder 20, and each output from the detectors 17, 18 is input to the second adder 21. The each output from the first and second adders 20, 21 is input to the subtracter 22, which in turn generates an output of focusing error signal $S_f$.

When the disk-like recording substrate 1 goes away from the objective lens system 5 with respect to the focal point of the light beams emitted from the ray source 3, i.e. the substrate 1 moves in the direction of arrow mark F, the two sub-beam fluxes $b_1$, $b_2$ split by the triangle-roof prism 14 are moved in the direction separating from each other, whereby the light spot $V_1$ between the photo detectors 16, 17 is moved toward the photo detector 16, and the light spot V₂ between the photo detectors 18, 19 is moved toward the photo detector 19. As a result, the outputs of the photo detectors 16, 19 respectively become larger than those of the photo detectors 17, 18. Accordingly, a focusing error signal $S_f$ is obtainable as a positive output at the subtracter 2. On the other hand, when the disk-like recording substrate 1 comes closer to the objective lens system 5 with respect to the focal point of the light beams emitted from the ray source 3, i.e. the disk-like recording substrate 1 moves toward the direction of arrow mark N, the two sub-beam fluxes $b_1$, $b_2$ split by the roofshaped prism 14 are moved in the direction approaching each other. Accordingly, the light spot $V_1$ between the photo detectors 16, 17 is moved toward the photo detector 17, and the light spot V₂ between the photo detectors 18, 19 is moved toward the photo detector 18. As a result, the outputs of the photo detectors 17, 18 respectively becomes larger than those of the photo detectors 16, 19. Accordingly, a focusing errOr signal $S_f$ is obtained aS a negative output at the subtracter 22. Namely, the sign (positive or negative) of the signal $S_f$ indicates a direction of deflection of the focal point and the magnitude of the signal $S_f$ indicates the distance of deflection of the focal point.

As described before, when the light beams for reading give the focal point of the disk-like recording substrate 1, the light spots $V_1$, $V_2$ respectively form the focal points correctly in the light detecting means 13. Therefore, it is a small possibility that an outer disturbance caused when the light beams for reading traverse the track 2 formed on the disk-like recording substrate 1 adversely affects the focusing error signal $S_f$.

In the conventional focusing error detecting apparatus having the construction as above-mentioned, it was necessary to locate the light spots $V_1$, $V_2$ in an Order of micron meter on the respective split lines of each pairs of photo detectors 16, 17 and 18, 19 of the light detecting means 13 for detecting the positions of the sub beam fluxes $b_1$, $b_2$. This caused a problem of difficulty to correctly locate the light spots. Further, it was necessary to control machining accuracy in preparation of the roof-shaped prism 14. This caused a problem of manufacturing the prism 14.

It is an object of the present invention to provide a focusing error detecting apparatus which unnecessities a roof-shaped prism requiring high machining accuracy; enables to obtain a focusing error signal by means of a single pair of photo detectors, and minimizes adverse effect caused by an outer disturbance due to the traverse of the light beams across the track of a disk-like recording substrate.

In accordance with the present invention, there is provided a focusing error detecting apparatus which comprises a ray source for emitting a ray flux, a focusing means for focusing the ray flux on a surface of an object substrate, a light detecting means comprising two photo detectors, an optical means for focusing a ray flux reflected from the surface of object substrate so that the ray flux comes to the middle of the two photo detectors when the focal point is formed on the surface of object substrate, a light switching means for switching the ray flux transmitted from the optical means at the two positions which correspond to the two photo detectors of the light detecting means, two holding means which respectively hold differences of output of the two photo detectors in correspondence to the switching operations of the light switching means, and a processing means for outputting a focusing error signal on the basis of the outputs of the holding means.

A preferred embodiment of the present invention will be described with reference to the drawings.

Figure 1:
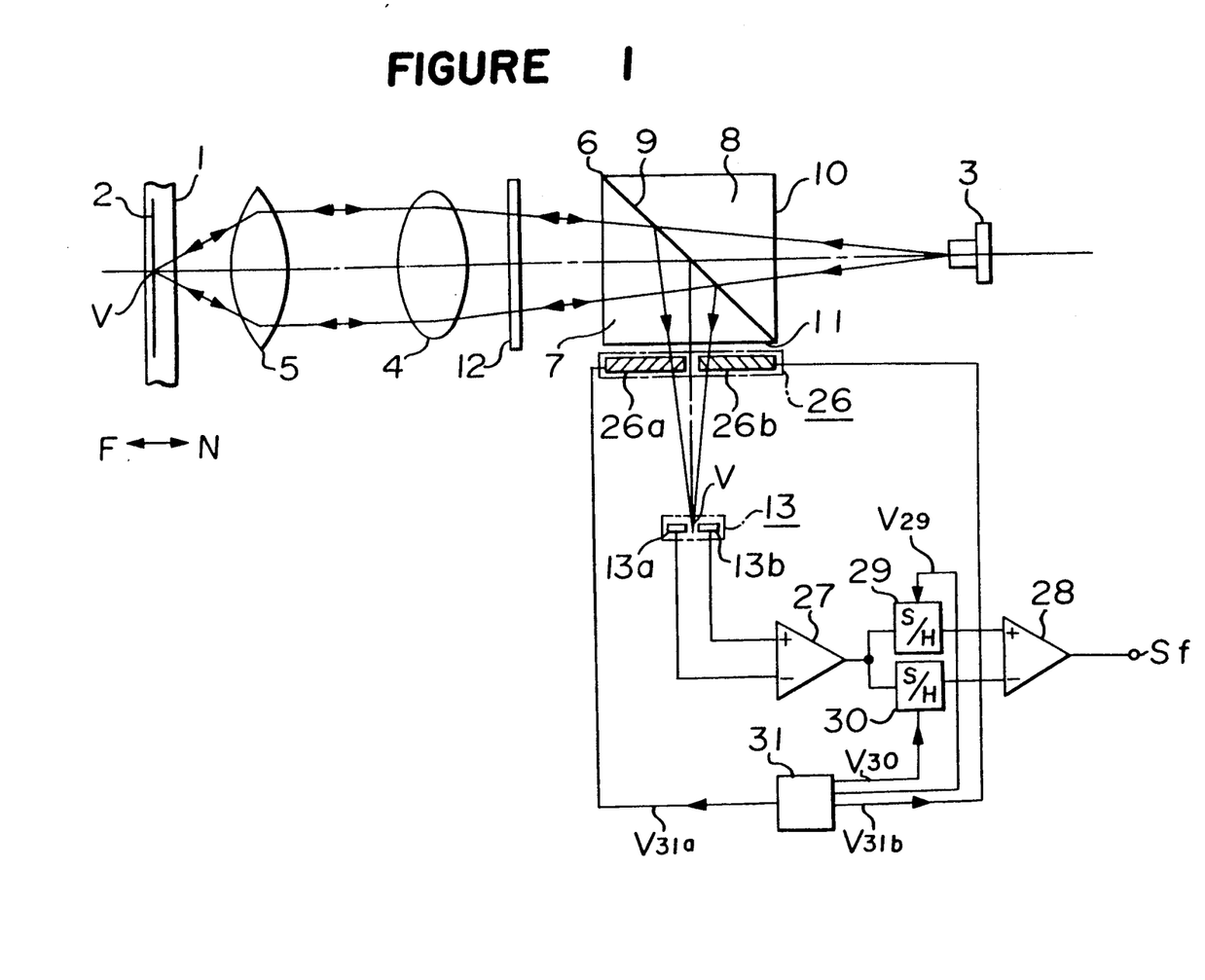
FIG. 1 is a diagram showing a general construction of an embodiment of the focusing error detecting apparatus according to the present invention.

FIG. 1 is a diagram showing the construction of an embodiment of the focusing error detecting apparatus according to the present invention. In FIG. 1, the same reference numerals designate the same or corresponding parts, and therefore description of these parts is omitted.

In FIG. 1, a light detecting means 13 is split into two elements, namely composed photo detectors 13a, 13b. A numeral 26 designates an interruption/deflection device composed of two elements 26a, 26b which can be controlled independently by an outer control device. The two interruption/deflection elements 26a, 26b are arranged in parallel to each other with a space therebetween and a line of split (an imaginary line) between the elements is so determined as to divide a light beam flux passing through the space into two equal parts. A numeral 27 designates a first subtracting circuit to subtract a value of the output of the photo detector 13a from a value of the output of the photo detector 13b, numerals 29, 30 designates first and second sampling/holding circuits to sample and hold the output of the subtracting circuit 27, a numeral 28 designates a second subtracting circuit to subtract a value of the output of the sampling-/holding circuit 30 from a value of the output of the sampling/holding circuit 29, and a numeral 31 designates a control circuit which controls the interruption/deflection device 26 and supplies control signals to the sampling/holding circuits 29, 30.

The interruption/deflection device 26 is a device capable of modulating the intensity of light or deflecting light passing therethrough by controlling it from the outside, and liquid crystal can be used for it. As a device having the function of interruption, i.e. an optic modulation element, an electro-optic modulator utilizing Pockels effect or Kerr effect, a magnet-optic modulator having Faraday effect or Kerr effect in magnetic terms, an acoustic optic element utilizing ultrasonic refraction or diffraction effect may be used. As a light deflecting element, an electro-optic deflector, an acoustic-optic deflector, a deflector utilizing magnetic elastic wave may be used. Since these elements do not cause in practical use deterioration of the optical properties of light passing therethrough, i.e. they do not deteriorate the wavefront aberration of light, it is possible to use them in an optical system for the focusing error detecting apparatus of the present invention without causing any problem.

In the following, a focusing error detecting apparatus in which an interruption element capable of modulating the intensity of light by electro-optic effect is used as an interruption/deflection device 26 will be described as an example.

In FIG. 1, light beams emitted from the ray source 3 are passed through the polarized beam splitter 6 and the λ/4 plate. The light beams are transformed into parallel beams by means of the lens 4. Then, the parallel beams give a light spot V having the smallest dimension on the disk-like recording substrate 1 by means of the objective lens system 5. The light spot V is reflected on the disk-like recording substrate 1 to pass through the objective lens system 5, the lens 4, the λ/4 plate 12 to be introduced into the polarized beam splitter 6. The light beams are reflected on the polarized beam splitter 6 as described before.

The light beams reflected by the polarized beam splitter 6 enter into the light detecting means 13 through the interruption/deflection device 26 which is composed of two interruption/deflection elements 26a, 26b which are independently controlled by the control circuit 31 so that the transmitting light to each of the elements can be interrupted.

A method of controlling the interruption/deflection elements 26a, 26b will be described with reference to FIG. 2.

Figure 2A:
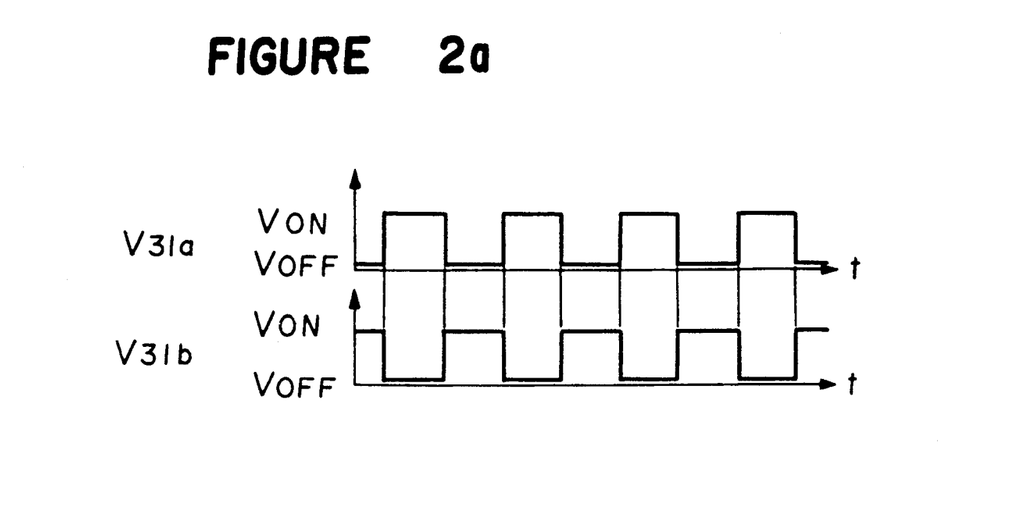
FIG. 2a is a diagram showing waveforms along time axes of voltages $V_{31}a$, $V_{31}b$ applied to elements 26a, 26b by means of a control circuit 31 in FIG. 1.

FIG. 2a shows the waveforms of voltages $V_{31a}$, $V_{31b}$ varying with the lapse of time, which are respectively applied to the elements 26a, 26b by means of the control circuit 31. As shown in FIG. 2a, the voltages $V_{31a}$, $V_{31b}$ are so controlled by the control circuit 31 that when $V_{31a}=V_{ON}$ (V), then, $V_{31b}=V_{OFF}$ (V), and on the other hand, when $V_{31a}=V_{OFF}$ (V), $V_{31b}=V_{ON}$ (V). The frequency of the voltages having rectangular waveforms are respectively so determined that they have a frequency of several tens times as high as the band region of a servo system which controls to give the focal point of light beams gathered by the objective lens system on the disk-like recording substrate 1. The interruption/deflection elements 26a, 26b are respectively so adapted that light passing therethorugh is interrupted when the applied voltage is $V_{ON}$ and light is permitted to pass when the applied voltage is $V_{OFF}$.

Figure 2B:
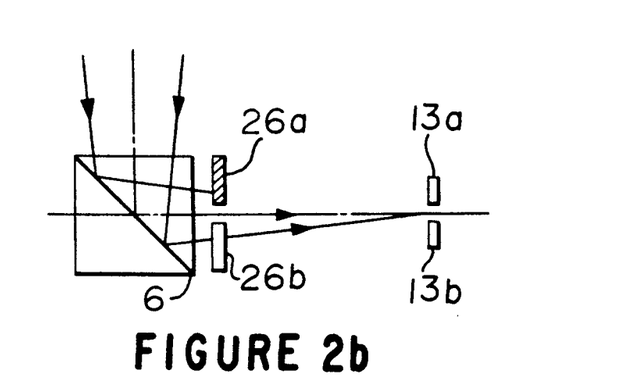
FIG. 2b is a diagram illustrating an incident ray to a light detecting means 13 when an applied voltage $v_{31}a = V_{ON}$ (V) and an applied voltage $V_{31}b = V_{OFF}$ (V)

FIG. 2b is a diagram illustrating a state of the incident ray to the light detecting means 13 when the applied voltage $V_{31a}=V_{ON}$ (V) and the applied voltage $V_{31b}=V_{OFF}$(V). In FIG. 2b, the element 26a interrupts the light and the element 26b transmits the light. Accordingly, among the light beams reflected by the polarized beam splitter 6, only a light flux incident on the element 26b enters in the light detecting means 13.

Figure 2C:
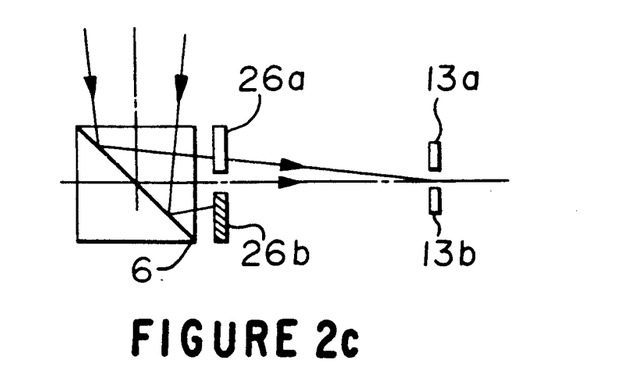
FIG. 2c is a diagram illustrating an incident ray to a light light detecting means when an applied voltage $V_{31}a = V_{OFF}$ (V) and an applied voltage $V_{31}b = V_{ON}$ (V)

FIG. 2c is a diagram illustrating a state of the incident ray to the light detecting means 13 when the applied voltage $V_{31a}=V_{OFF}$ (V) and the applied voltage $V_{31b}=V_{ON}$ (V). In this case, the element 26a permits the light to pass therethrough and the element 26b interrupts the light. Accordingly, among the light beams reflected by the polarized beam splitter 6, only the light flux incident on the element 26a enters in the light detecting means 13.

A possibility of detecting a focusing error by controlling the elements 26a, 26b in the same manner as a case using a conventional Foucault method will be described with reference to FIG. 3.

Figure 3A:
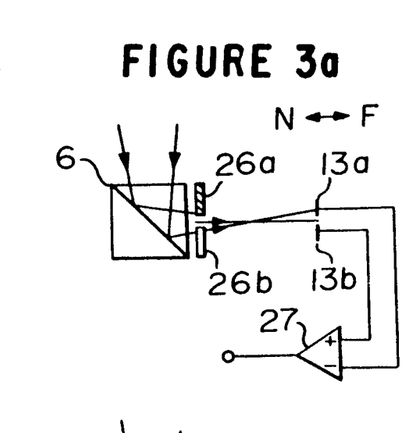
FIGS. 3a, 3b, 3c, 3d, 3e and 3f are diagrams showing various states in focusing error detecting operations.
Figure 3B:
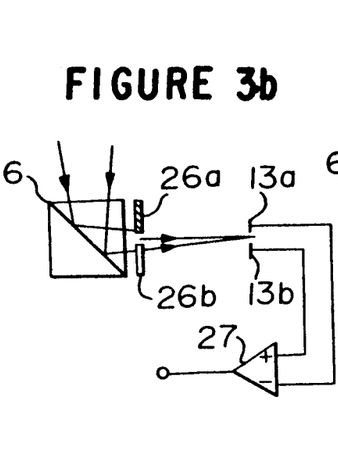
Figure 3C:
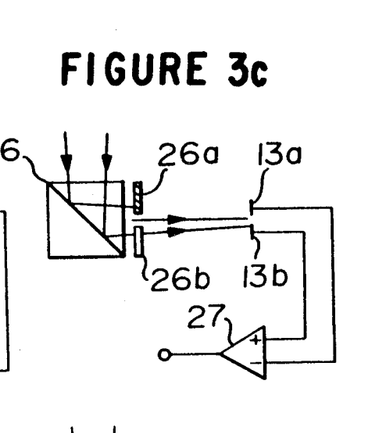
Figure 3D:
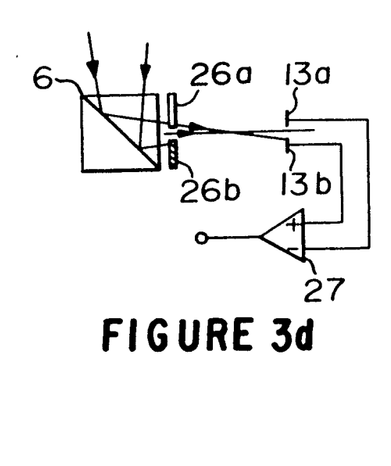
Figure 3E:
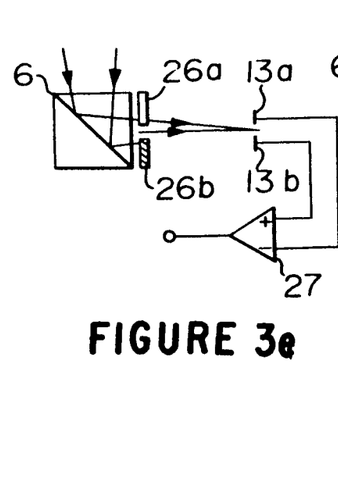
Figure 3F:
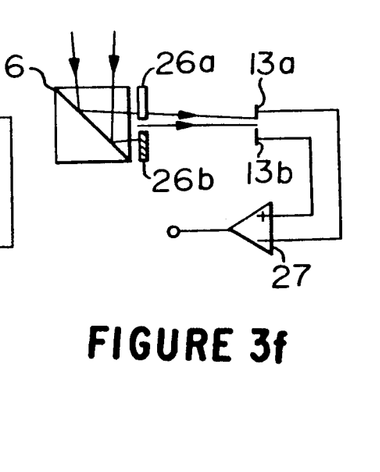

FIGS. 3a, 3b and 3c respectively show states that the interruption/deflection element 26a interrupts light, and FIGS. 3d, 3e and 3f show states that the interruption/deflection element 26b interrupts light. FIGS. 3a and 3d show states of the reflective light when the objective lens system 5 goes away from the disk-like recording substrate 1, and FIGS. 3b and 3e show states of the reflective light when the focal point formed by the objective lens system 5 is correctly on the disk like recording substrate 1, and FIGS. 3c and 3f show states of the reflective light when the objective lens system 5 comes close to the disk-like recording substrate.

First, the cases as in FIGS. 3a, 3b and 3c will be explained.

When there appears a phenomenon as in FIG. 3a, namely, the objective lens system 5 goes away from the disk-like recording substrate 1, the reflective light from the disk-like recording substrate 1 forms a focal point before the light detecting means 13, i.e. in the direction of the arrow mark N. Accordingly, the output of the photo detector 13a becomes larger than that of the photo detector 13b, whereby the output of the subtracting circuit 27, i.e. a focusing error signal has a negative value. On the other hand, when there appears a phenomenon as shown in FIGS. 3b, namely, the focal point of the objective lens system 5 is just on the disk-like recording substrate 1, the reflective light from the disk-like recording substrate 1 forms the focal point on the split line between the photo detectors 13a, 13b. Accordingly, the outputs of the photo detectors 13a, 13b are equal to each other, and the output of the subtracting circuit 27, i.e. a focusing error signal becomes 0. When there appears a phenomenon as in FIG. 3c, namely, the objective lens system 5 comes closer to the disk-like recording substrate 1, the reflective light from the disk-like recording substrate 1 forms the focal point behind the light detecting means 13, i.e. in the direction of the arrow mark F. Accordingly, the output of the photo detector 13b becomes larger than that of the photo detector 13a, whereby the output of the subtracting circuit 27, i.e. a focusing error signal has a positive value. Above-mentioned phenomena are just the same as the function performed by the light beams which are divided into two parts when the Foucault method is utilized. For instance, the above-mentioned phenomena correspond to the behavior of the light beams bl as in FIG. 5.

Similarly, when there appears a phenomenon as in FIG. 3d, namely, the objective lens system 5 goes away from the disk-recording substrate 1, the reflective light from the substrate 1 forms a focal point before the light detecting means 13, i.e. in the direction of the arrow mark N. Accordingly, the output of the photo detector 13b becomes larger than that of the photo detector 13a, whereby the output of the subtracting circuit 27, i.e. the signal of a focusing error signal is positive. In the case of FIG. 3e, the focal point of the objective lens system 5 is just on the disk-like recording substrate 1 and the reflective light from the substrate 1 forms its focal point on the split line between the photo detectors 13a, 13b. Accordingly, the outputs of the photo detectors 13a, 13b are equal to each other, and the output of the subtracting circuit 27, i.e. a focusing error signal becomes 0. When there appears a phenomenon as in FIG. 3f, namely, the objective lens system 5 comes closer to the disk-like recording substrate 1, the reflective light from the substrate 1 forms the focal point behind the light detecting means 13, i.e. in the direction of the arrow mark F. Accordingly, the output of the photo detector 13a becomes larger than that of the photo detector 13b, whereby the output of the subtracting circuit 27, i.e. the sign of a focusing error signal is negative. The above-mentioned phenomena are just same as the function performed by the light beams split into two parts when a conventional Foucault method is used. For instance, the above-mentioned phenomena correspond to the behavior of the light beams $b_2$ as in FIG. 5.

Figure 4:
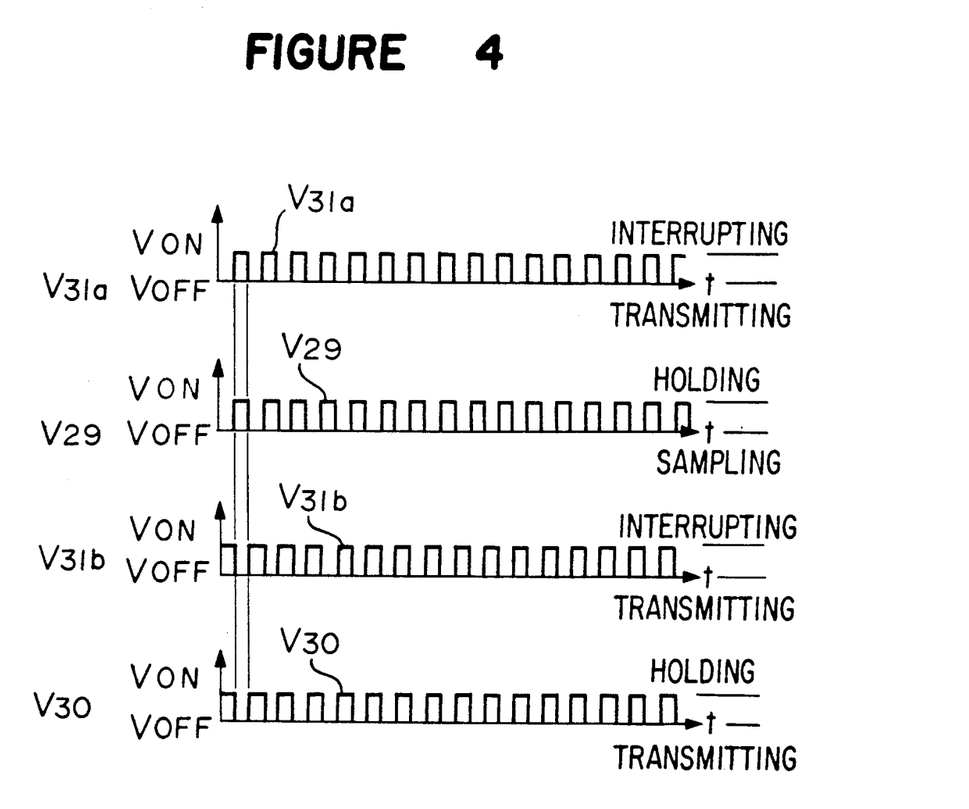
FIG. 4 is a timing chart showing timing of a control signal output from the control circuit 31.

The output of the subtracting circuit 27, namely, the focusing error signal at each time point is temporarily held in the sampling/holding circuits 29, 30 controlled by the control circuit 31. FIG. 4 is a timing chart showing timing of control signals output from the control circuit 31 in which a numeral $V_{31a}$ designates a signal supplied to the interruption/deflection element 26a, a numeral $V_{29}$ designates a signal supplied to the sampling/holding circuit 29, a numeral $V_{31b}$ designates a signal supplied to the interruption/deflection element 26b and a numeral $V_{30}$ designates a signal supplied to the sampling/holding circuit 30. The sampling/holding circuits 29, 30 perform holding operations when the signals $V_{29}$, $V_{30}$ are respectively $V_{ON}$ and perform sampling operations when the signals are respectively $V_{OFF}$. Accordingly, when the signal $V_{31a}=V_{ON}$ and the signal $V_{31b}=V_{OFF}$, namely, when the element 26a interrupts light and the elements 26b transmits light, the output of the subtracting circuit 27 effected by the light transmitting the element 26b, i.e. the focusing error signal is held by the sampling/holding circuit 30, whereas the sampling/holding circuit 29 is kept as is in a holding state. On the other hand, when the signal $V_{31a}=V_{OFF}$ and the signal $V_{31b}=V_{ON}$, namely, when the element 26a transmits light and the element 26b interrupts light, the output of the subtracting circuit 27 effected by the light transmitting the element 26a, i.e. the focusing error signal is held by the sampling/holding circuit 29, whereas the sampling/holding circuit 30 is kept as is in a holding state.

In other words, the interruption/deflection elements 26a, 26b alternately transmits light on the basis of the control signal of the control circuit 31, and the focusing error signal produced by the light transmitting the element 26a is held by the sampling/holding circuit 29 and the focusing error signal produced by the light transmitting the element 26d is held by the sampling/holding circuit 30 in an alternate fashion. The outputs of the sampling/holding circuits 29, 30 are input in the subtracting circuit 28, and finally, a focusing error signal $S_f$ is obtained as an output from the subtracting circuit 28. In the conventional technique utilizing the Foucault method, two light beams are used. On the other hand, in the present invention, two light beams are produced by switching the transmission of light to the interruption/refraction elements 26a, 26b alternately at a frequency of several tens times as the servo band region, namely, the two light beams are produced by time sharing. And, two focusing error signals can be continuously obtained by sampling/holding the focusing error signals detected on the basis of the respective light beams, which provides the same effect of detection of error as obtained by the conventional Foucault method.

The focusing error detecting apparatus of the above-mentioned embodiment of the present invention unnecessitates requirements of accuracy in adjustment in comparison with the conventional technique utilizing the Foucault method in which two light beams are used and the roof-shaped prism which requires precise dimensions by machining. It is possible to detect a focusing error without adverse effect by an outer disturbance in the same manner as the conventional technique utilizing the Foucault method.

In the above-mentioned embodiment, description has been made as to the case that the interruption/deflection device 26 has the function of interruption. However, the present invention is not limited to this and the interruption/deflection device having the function of deflection or having both functions can be utilized as far as the device has the function of switching light at a high speed. For instance, for such device, a magnetoptic modulator, an acoustic element, a liquid crystal device, an electro-optic deflector, a magnetic elastic wave deflecting element and so on can be used as far as they have a switching function to switch alternately light beams entering in two photo detectors.

Further, in the above-mentioned embodiment, the sampling/holding circuits are used to simultaneously process the signals, and operations are performed by the processing circuit to perform processing in an analogeous manner. However, all processing operations can be performed by transforming the signals produced by switching the light beams into a digital form.

Thus, in accordance with the present invention, the light detecting means is composed of two photo detectors; two light beams are caused to enter into the two-divided photo detectors from two portions through the light switching element in a time sharing manner, and the focusing error signals produced by the respective light beams are temporarily held for calculations, to thereby obtain continuous focusing error signals. Accordingly, it is unnecessary to provide a plurality of two-divided photo detectors and the roof-shaped prism which require severe accuracy for machining and adjusting. Therefore, working for adjustment and processing can be simplified. Further, the advantage obtained by using the Foucault method can be obtained.

What is claimed is:

1. A focusing error detecting apparatus which comprises:
   a ray source for emitting a ray flux,
   a focusing means for focusing the ray flux to a focal point on a surface of an object substrate,
   a light detecting means comprising two photo detectors,
   an optical means for focusing a ray flux reflected from said surface of object substrate so that the ray flux comes to the middle of a space formed between said two photo detectors when the focal point is formed on said surface of object substrate,
   a light switching means for switching the ray flux transmitted from said optical means said light switching means having two switching states which respectively pass the ray flux to said two photo detects of the light detecting means,
   two sampling holding means each of which respectively receives an output of said two photo detectors during each of said two states of said light switching means, and a process means for outputting a focusing error signal on the basis of the outputs of said sampling holding means.

2. The focusing error detecting apparatus according to claim 1, wherein said light switching means comprises a control circuit and two interruption elements disposed between a deflection light beam splitter and said light detecting means so as to form a second space therebetween through which said ray flux transmitted from said optical means passes.

3. The focusing error detecting apparatus according to claim 2, wherein said two interruption elements are alternately turned on and off by said control circuit.

4. The focusing error detecting apparatus according to claim 2, wherein said sampling holding means is a sampling/holding circuit connected to said control circuit.

5. The focusing error detecting apparatus according to claim 1, wherein said processing means is a subtracting circuit for subtracting an output of one of said sampling holding means from an output of another of said sampling holding means.

* * * * *